(12) United States Patent
Okanoue et al.

(10) Patent No.: US 6,738,439 B1
(45) Date of Patent: May 18, 2004

(54) DIVERSITY RECEPTION METHOD AND DIVERSITY RECEIVER

(75) Inventors: Kazuhiro Okanoue, Tokyo (JP); Takeshi Yamamoto, Tokyo (JP); Tomoki Osawa, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/494,588

(22) Filed: Jan. 31, 2000

(30) Foreign Application Priority Data

Feb. 2, 1999 (JP) .......................................... 11/025413

(51) Int. Cl.[7] .................................................. H04B 1/16
(52) U.S. Cl. .................. 375/347; 455/343.1; 455/343.2
(58) Field of Search ................................ 375/347, 267, 375/340; 370/328, 329, 334, 339, 349, 389; 455/132, 137

(56) References Cited

U.S. PATENT DOCUMENTS

| | | | |
|---|---|---|---|
| 4,761,822 A | * | 8/1988 | Maile .......................... 455/82 |
| 5,513,385 A | * | 4/1996 | Tanaka ........................ 455/228 |
| 5,757,853 A | * | 5/1998 | Tsujimoto ................... 375/141 |
| 5,790,529 A | * | 8/1998 | Haber ......................... 370/536 |
| 6,088,407 A | * | 7/2000 | Buternowsky et al. ...... 375/347 |
| 6,141,392 A | * | 10/2000 | Hoshikuki et al. .......... 375/347 |

FOREIGN PATENT DOCUMENTS

| | | |
|---|---|---|
| JP | 63-158922 | 7/1988 |
| JP | 2556179 | 9/1996 |
| JP | 2689926 | 8/1997 |
| JP | 10-28107 | 1/1998 |

* cited by examiner

Primary Examiner—Tesfaldet Bocure
Assistant Examiner—Qutbuddin Ghulamali
(74) Attorney, Agent, or Firm—Dickstein, Shapiro, Morin & Oshinsky, LLP.

(57) ABSTRACT

A diversity receiver having n (integer of 2 or more) antenna branches for receiving a packet made up of a preamble field and data field includes n first switches, second switch, packet detection circuit, and demodulation section. The n first switches receive signals respectively received by the n antenna branches and a "packet receive pulse" representing that a packet is being received, and change the output destination based on the "packet receive pulse". The second switch receives an antenna switching signal and outputs from the n first switches, and when no "packet receive pulse" is output, selects and outputs the outputs from the n first switches based on the antenna switching signal. The packet detection circuit receives an output from the second switch, and when a packet is being received, outputs a "packet receive pulse". The demodulation section receives and demodulates all or some of the outputs from the n first switches when a "packet receive pulse" is input.

13 Claims, 11 Drawing Sheets

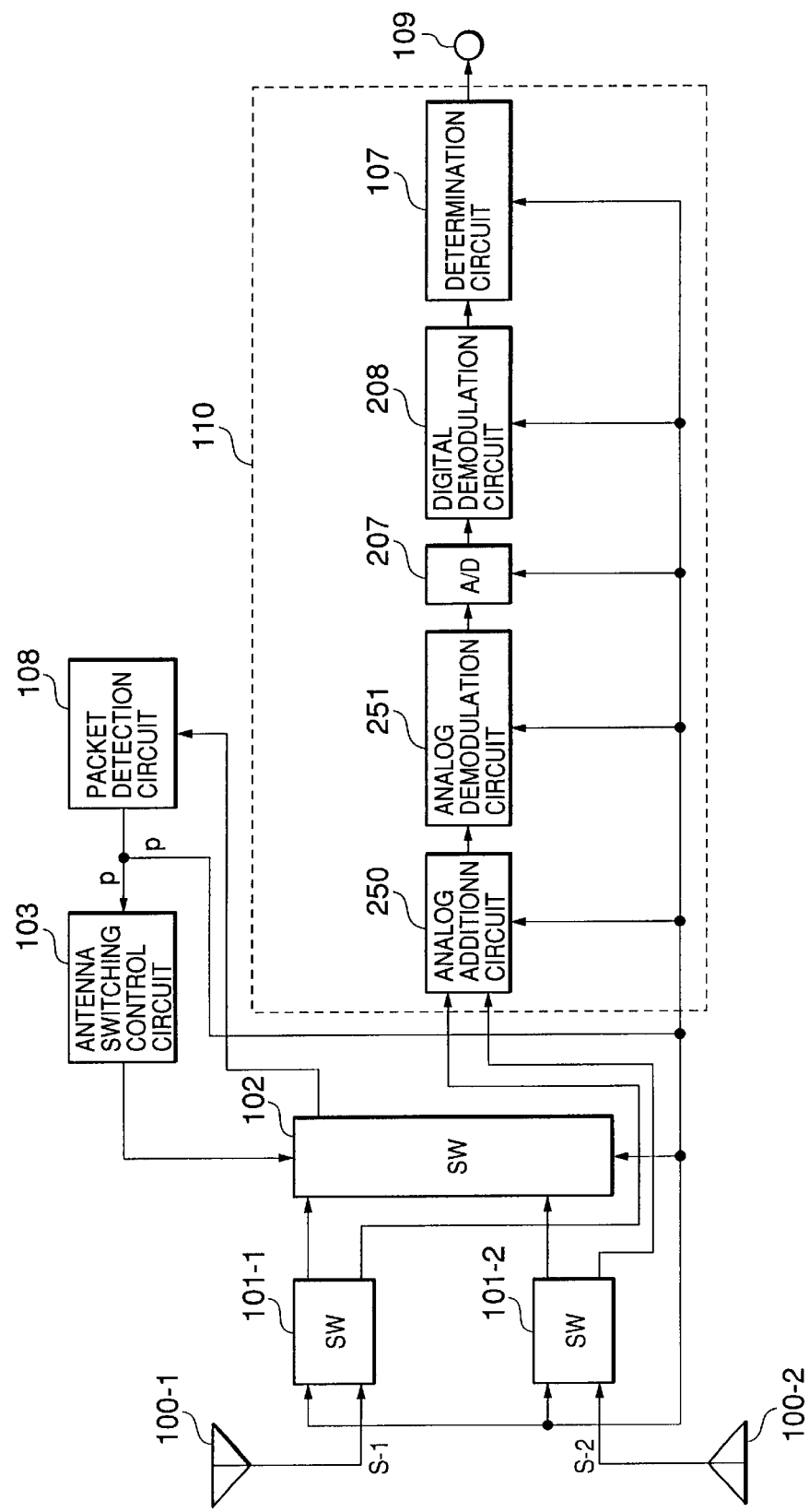

DIVERSITY RECEPTION METHOD AND DIVERSITY RECEIVER

BACKGROUND OF THE INVENTION

1. Field of the Invention

The present invention relates to a diversity reception method and diversity receiver used to receive a packet made up of a preamble field and data field.

2. Description of the Prior Art

According to a conventional method as disclosed in Japanese Unexamined Patent Publication No. 63-158922, an antenna branch having a maximum reception signal power upon reception of a preamble field is selected, and a data field is demodulated based on a reception signal from the selected antenna branch.

Japanese Unexamined Patent Publication No. 10-28107 discloses a diversity receiver shown in the block diagram of FIG. 1 as a diversity receiver for receiving a packet made up of a preamble field and data field having undergone direct spread modulation. FIG. 1 shows a receiver using two antenna branches.

In FIG. 1, reference numerals 1000-1 and 1000-2 denote antenna branches; 1001, a switch (SW); 1002, a gate; 1003, a demodulation circuit; 1004, an antenna switching control circuit; and 1005, an output terminal.

This diversity receiver cannot predict packet arrival. For this reason, the antenna branches 1000-1 and 1000-2 are selected by the switch 1001 at a predetermined period, and a reception signal from the selected antenna branch is supplied to the antenna switching control circuit 1004 and gate 1002.

The antenna switching control circuit 1004 calculates the correlation between an input signal and spreading code. When the peak value of the correlation is equal to or higher than a predetermined threshold, a packet arrival detection pulse is output to the switch 1001 and gate 1002. Upon reception of this pulse, the switch 1001 stops periodic switching operation and holds the current state.

Upon reception of the pulse reception detection pulse, the gate 1002 opens its gate to supply an input signal to the demodulation circuit 1003. The demodulation circuit 1003 demodulates the input signal and outputs the demodulation result to the output terminal 1005 on the basis of the signal via the gate 1002. These methods can be classified into a pre-detection antenna switching diversity method, which can be implemented by a simple receiver.

According to another method, a diversity receiver which provides more excellent characteristics uses a signal obtained after detecting a reception signal from each antenna branch, though the structure of the receiver is complicated.

For example, Japanese Unexamined Patent Publication No. 03-214819 discloses a post-detection selection diversity method of selecting an antenna branch using a signal after detection.

This method is shown in FIG. 2. FIG. 2 shows a receiver using two antenna branches 1000-1 and 1000-2. Reception signals from the antenna branches 1000-1 and 1000-2 are detected by detection circuits 1100-1 and 1100-2, and channel impulse responses of reception signals are estimated by channel impulse response estimation circuits 1101-1 and 1101-2.

Based on the channel impulse responses estimated by the channel impulse response estimation circuits, an antenna branch receiving a reception signal, which has the smallest distortion, and supplying the channel impulse response estimated from the reception signal is selected by a selection control circuit 1102 and switches 1103 and 1104. The data field is equalized and demodulated by an equalizer 1105.

In FIG. 2, the receiver comprises the antenna branches 1000-1 and 1000-2, detection circuits 1100-1 and 1100-2, channel impulse response estimation circuits 1101-1 and 1101-2, selection control circuit 1102, switches 1103 and 1104, and equalizer 1105. Reference numeral 1106 denotes an output terminal.

Further, Japanese Unexamined Patent Publication No. 08-163103 discloses a post-detection combining diversity method of detecting a reception signal from each antenna branch and combining the post-detection signals.

This method is shown in FIG. 3. FIG. 3 shows a receiver using two antenna branches 1000-1 and 1000-2. Reception signals from the antenna branches 1000-1 and 1000-2 are respectively detected by detection circuits 1100-1 and 1100-2, and the channel impulse responses of the reception signals are estimated by channel impulse response estimation circuits 1101-1 and 1101-2.

Branch metrics for the reception signals from the respective antenna branches are calculated by branch metric calculation circuits 1201-1 and 1201-2 on the basis of the reception signals from the respective antenna branches and their estimated channel impulse responses. The calculated branch metrics are combined by a combining circuit 1202, and the data field is demodulated by a Viterbi equalizer 1203 based on the synthesized value.

In FIG. 3, the receiver comprises the antenna branches 1000-1 and 1000-2, detection circuits 1100-1 and 1100-2, channel impulse response estimation circuits 1101-1 and 1101-2, branch metric calculation circuits 1201-1 and 1201-2, synthesis circuit 1202, and Viterbi equalizer 1203. Reference numeral 1204 denotes an output terminal.

In the conventional pre-detection antenna switching diversity method shown in FIG. 1, even if packet arrival is detected based on a signal from a given antenna branch, a signal received by another antenna branch may have a larger reception power.

However, shortening the preamble field to increase the transmission efficiency limits the time required to confirm the reception state of other antenna branches. Thus, if the number of antenna branches is increased to improve reception characteristics, the antenna branch is not always switched to an optimum one.

By applying to packet transfer the post-detection selection diversity method and post-detection combining diversity method shown in FIGS. 2 and 3, the number of antenna branches can be increased while the length of the preamble field remains the same. However, these methods cannot predict packet arrival, so demodulators equal in number to antenna branches must always operate. This leads to large power consumption of the receiver.

SUMMARY OF THE INVENTION

The present invention has been made in consideration of the above situation, and has as its object to provide a diversity reception method and diversity receiver capable of suppressing the power consumption of the receiver and increasing the number of antenna branches to improve reception characteristics even in communicating a packet having a short preamble field.

To achieve the above object, according to the first aspect of the present invention, there is provided a diversity reception method for a diversity receiver having n (integer not smaller than 2) antenna branches for receiving a packet made up of a preamble field and data field, comprising the steps of switching the n antenna branches to detect packet arrival when no packet arrival is detected, stopping switching the n antenna branches when packet arrival is detected, and performing reception operation by demodulating the packet based on all signals received by the n antenna branches after the packet detection.

According to the second aspect of the present invention, there is provided a diversity receiver having n (integer not smaller than 2) antenna branches for receiving a packet made up of a preamble field and data field, comprising n first switches for receiving signals respectively received by the n antenna branches and a "packet receive pulse" representing that the packet is being received, and changing an output destination based on the "packet receive pulse", a second switch for receiving an antenna switching signal and outputs from the n first switches, and when no "packet receive pulse" is output, selecting and outputting the outputs from the n first switches based on the antenna switching signal, a packet detection circuit for receiving an output from the second switch, and when the packet is being received, outputting the "packet receive pulse", an antenna switching control circuit for outputting said antenna switching signal when the "packet receive pulse" is not input, and a demodulation section for receiving and demodulating all or some of the outputs from the n first switches when the "packet receive pulse" is input.

According to the third aspect of the present invention, there is provided a diversity receiver having n (integer not smaller than 2) antenna branches for receiving a packet made up of a preamble field and data field, comprising (n−1) first switches for receiving signals respectively received by (n−1) antenna branches and a "packet receive pulse" representing that the packet is being received, and changing an output destination based on the "packet receive pulse", a second switch for receiving an antenna switching signal and outputs from the (n−1) first switches, and when no "packet receive pulse" is output, selecting and outputting the outputs from the (n−1) first switches based on the antenna switching signal, one (n−(n−1)) antenna branch which is not connected to the first switches, and always directly outputs a reception signal to the second switch regardless of input/non-input of the "packet receive pulse", one specific demodulation circuit for receiving a signal received by the (n−(n−1)) antenna branch via the second switch to always perform demodulation operation, a packet detection circuit for receiving a demodulated signal from the specific demodulation circuit, and when the packet is being received, outputting the "packet receive pulse", and a demodulation section for receiving and demodulating all or some of the outputs from the (n−1) first switches when the "packet receive pulse" is input.

As is apparent from the above aspects, according to the present invention, the n antenna branches are periodically switched to detect arrival of a packet by one demodulation circuit in the demodulation section. When packet arrival is detected, other demodulation circuits are sequentially activated to demodulate reception signals from the n antenna branches. Hence, only one demodulation circuit suffices to operate upon detection of packet arrival, which reduces power consumption. After detection of packet arrival, all the signals received by the n antenna branches can be demodulated and synthesized. Even in communicating a packet having a short preamble field, reception characteristics can be improved by increasing the number of antenna branches.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 12 is a block diagram showing the schematic arrangement of a diversity receiver according to the third embodiment of the present invention;

DETAILED DESCRIPTION OF PREFERRED EMBODIMENTS

Several preferred embodiments of the present invention will be described below with reference to the accompanying drawings.

Diversity Reception Method

Figure 1:
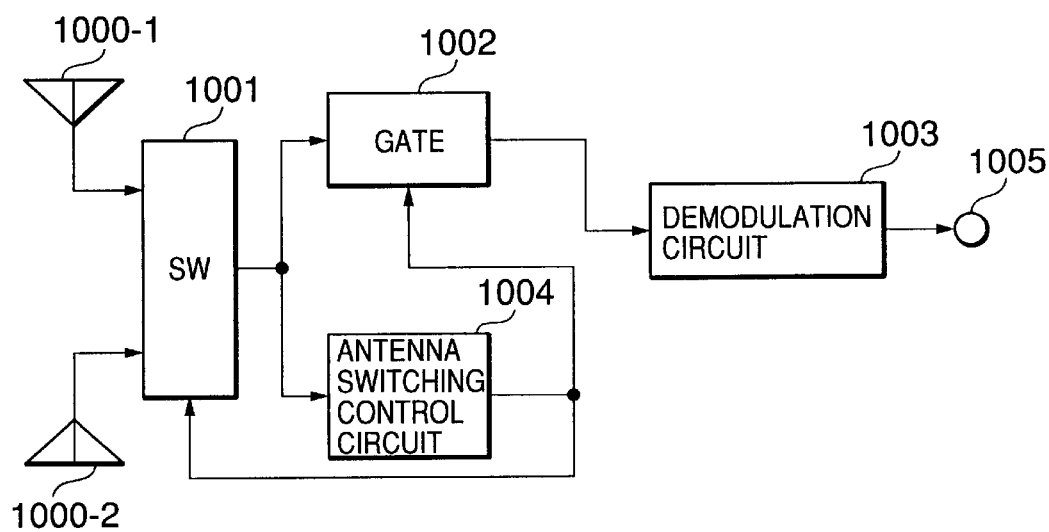
FIG. 1 is a block diagram showing the schematic arrangement of a receiver which achieves a pre-detection antenna switching diversity method according to a prior art.
Figure 2:
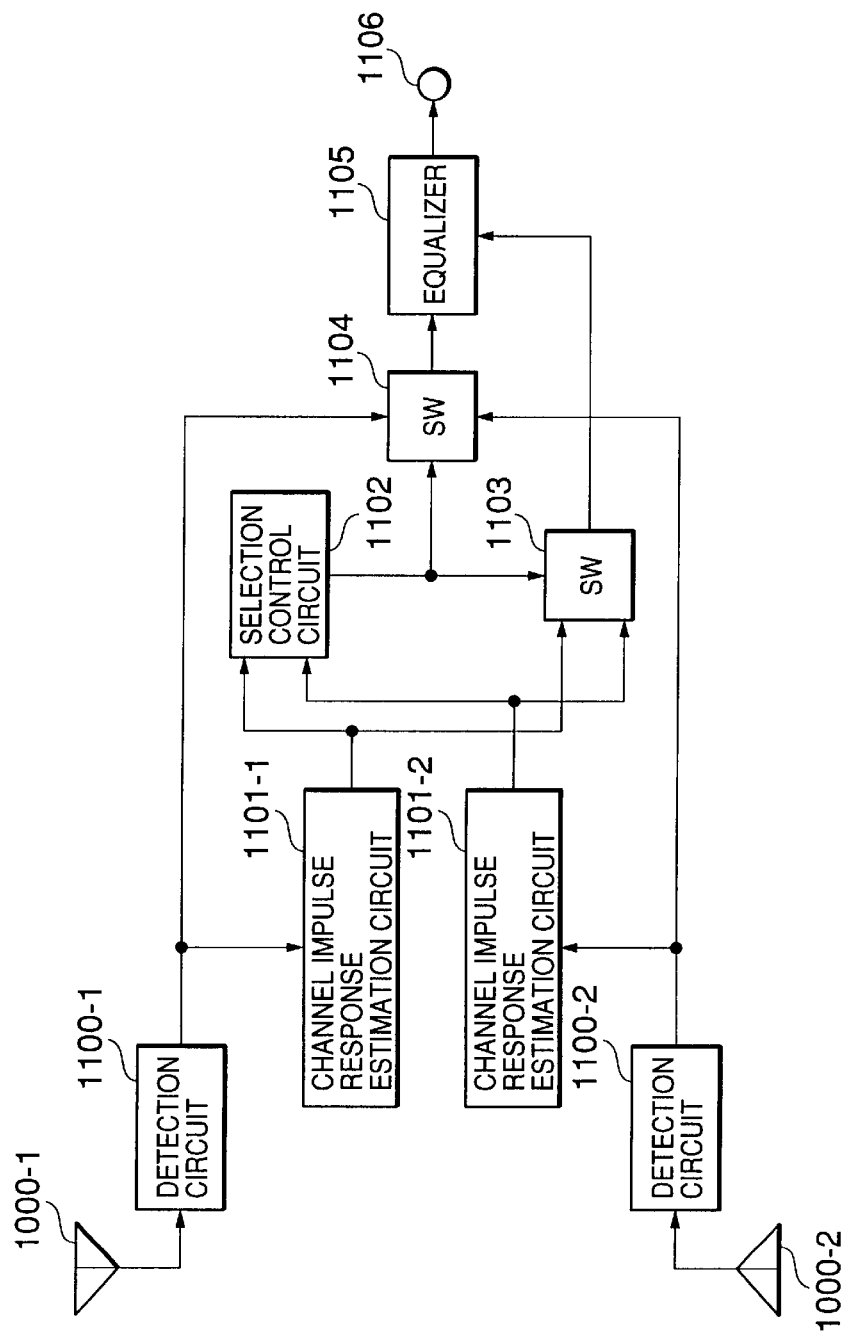
FIG. 2 is a block diagram showing the schematic arrangement of a receiver which achieves a post-detection selection diversity method according to another prior art.
Figure 3:
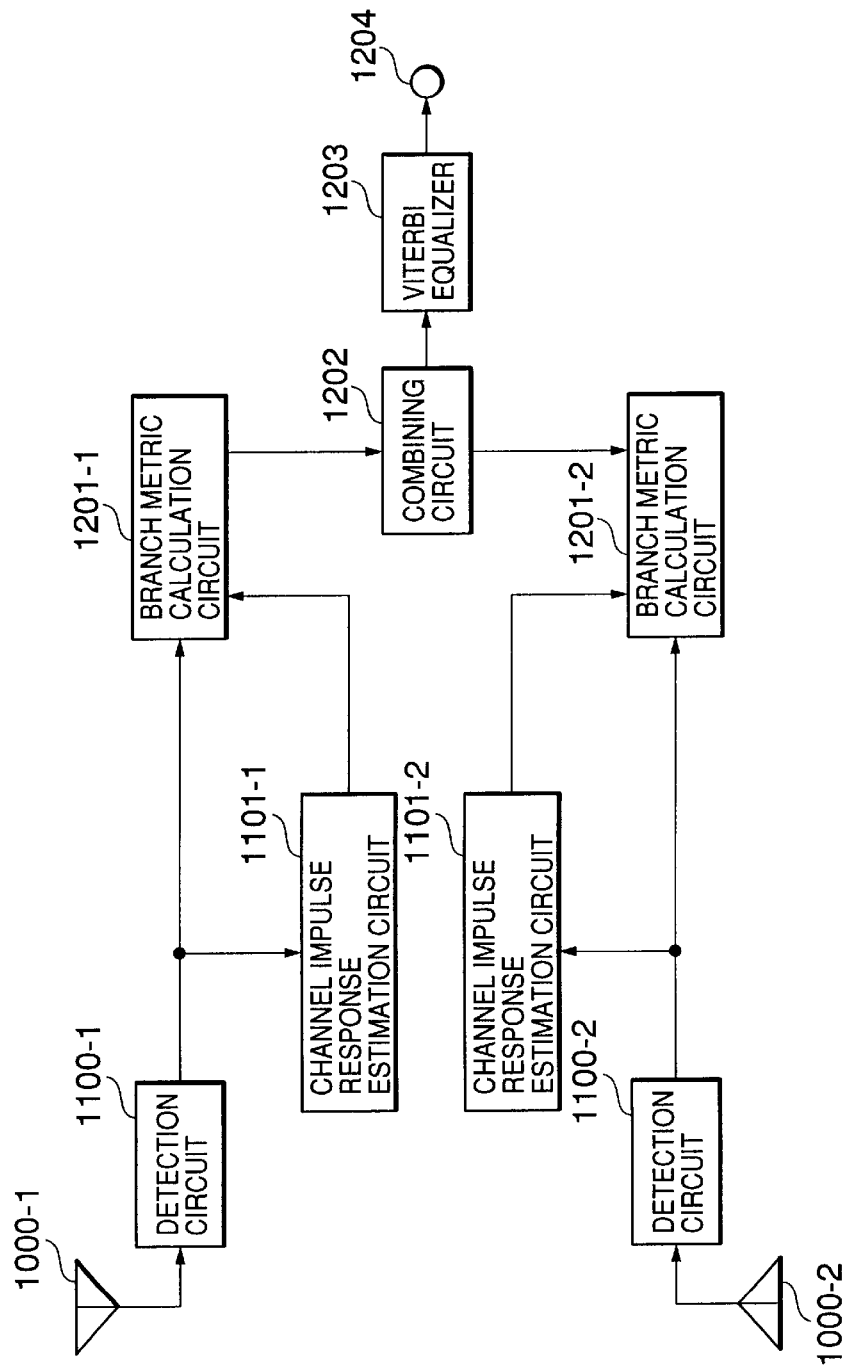
FIG. 3 is a block diagram showing the schematic arrangement of a receiver which achieves a post-detection synthesis diversity method according to still another prior art.
Figure 4:
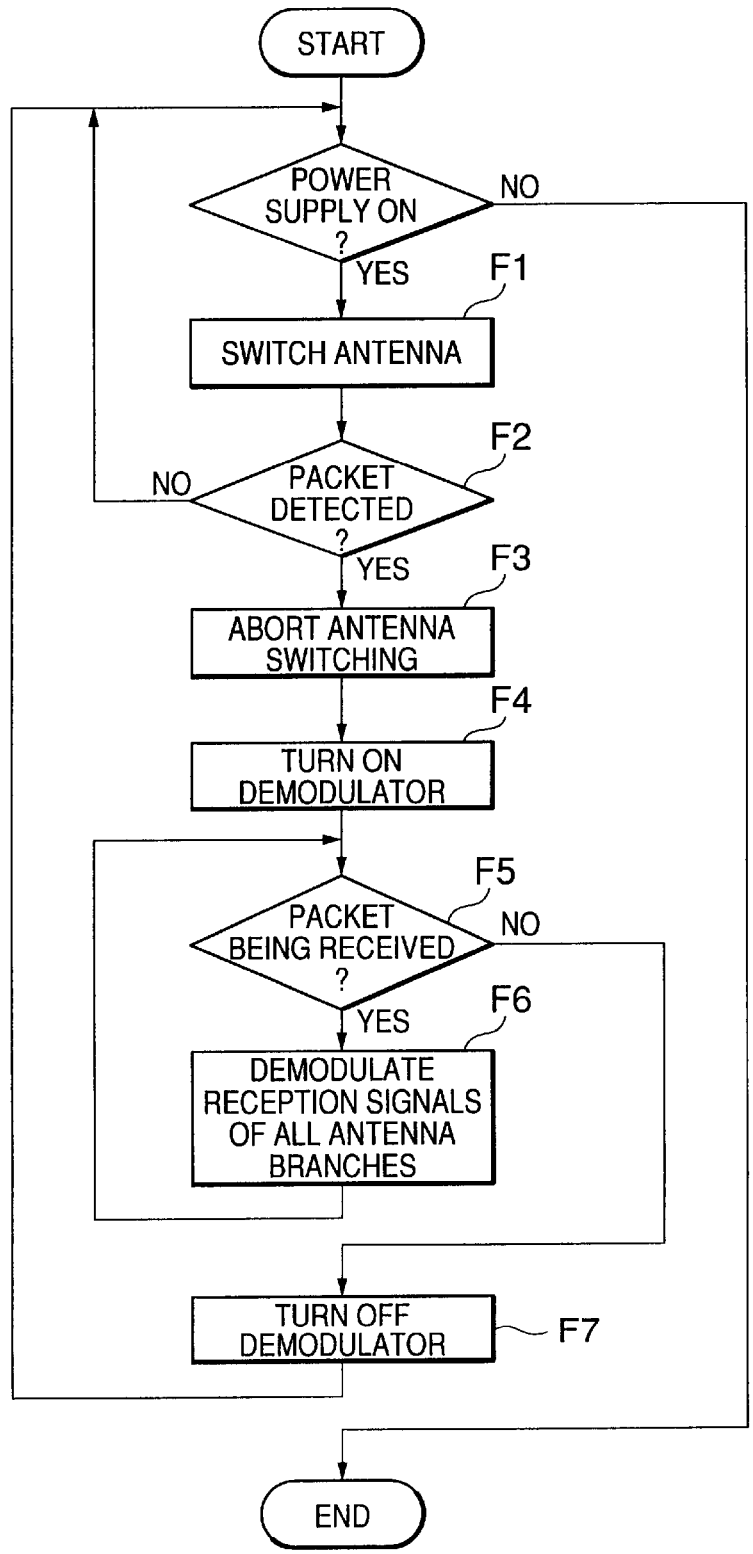
FIG. 4 is a flow chart showing a diversity reception method according to the present invention.

FIG. 4 is a flow chart showing a diversity reception method according to the present invention. In FIG. 4, reference symbol F1 denotes an antenna switching step; F2, a packet detection determination step; F3, an antenna switching abort step; F4, a demodulator operation start step; F5, a packet receive determination step; F6, an all-antenna-branch reception signal demodulation step; and F7, a demodulator stop step.

When a receiver is turned on to start reception operation, arrival of a packet is detected while switching all the antennas in the antenna switching step F1 and packet detection determination step F2. If arrival of a packet is detected, antenna switching aborts itself in the antenna switching abort step F3. At the same time, the power supply voltage is applied to all the demodulators to start operating in the demodulator operation start step F4.

Until the completion of packet receive process is detected in the packet receive determination step F5, reception signals from all the antenna branches are input to the demodulators which have started operating in the demodulator operation start step F4, and received packets are demodulated (all-antenna-branch reception signal demodulation step F6).

If the completion of packet receive process is detected in the packet receive determination step F5, the demodulators operating in the all-antenna-branch reception signal demodulation step F6 stop operating (demodulator stop step F7), thereby reducing power consumption.

The processing shifts to the antenna switching step F1 and packet detection determination step F2 to restart packet detection while switching all the antennas.

Diversity Receiver According to First Embodiment

The first embodiment of a diversity receiver according to the present invention will be described with reference to the block diagram of FIG. 5.

Figure 5:
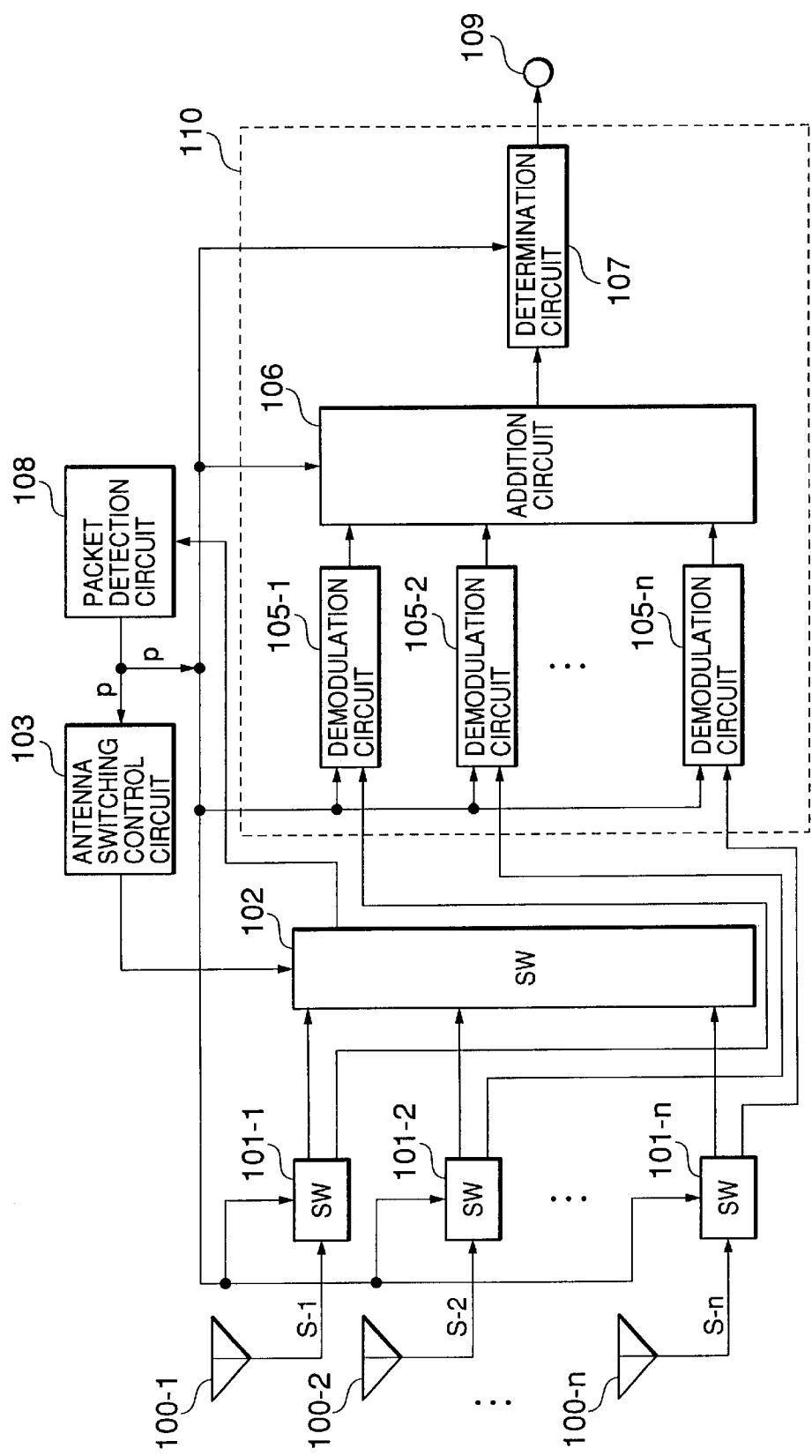
FIG. 5 is a block diagram showing the schematic arrangement of a diversity receiver according to the first embodiment of the present invention.

In FIG. 5, reference numerals 100-1 to 100-n denote n antenna branches; 101-1 to 101-n, first switches; 102, a second switch; 103, an antenna switching control circuit; 108, a packet detection circuit; and 109, an output terminal.

Reference numerals 105-1 to 105-n denote demodulation circuits corresponding to respective antenna branches; 106, an addition circuit; and 107, a determination circuit. The circuits 105, 106, and 107 constitute a demodulation section 110.

Signals s-1 to s-n received by the n antenna branches 100-1 to 100-n are respectively input to the first switches 101-1 to 101-n. These first switches 101-1 to 101-n also receive a packet receive pulse p from the packet detection circuit 108. The first switches 101-1 to 101-n are set to output signals received by the n antenna branches 100-1 to 100-n to the demodulation circuits 105-1 to 105-n while the pulse is input.

On the other hand, the first switches 101-1 to 101-n are set to output the signals s-1 to s-n received by the n antenna branches 100-1 to 100-n to the second switch 102 when no packet receive pulse p is input.

The second switch 102 receives an antenna switching signal from the antenna switching control circuit 103, selects one of the signals s-1 to s-n received by the n antenna branches 100-1 to 100-n on the basis of the antenna switching signal, and outputs the selected signal to the packet detection circuit 108. The packet detection circuit 108 detects packet arrival based on the signal input from the second switch 102, and keeps outputting the packet receive pulse p during packet arrival.

Figure 6:
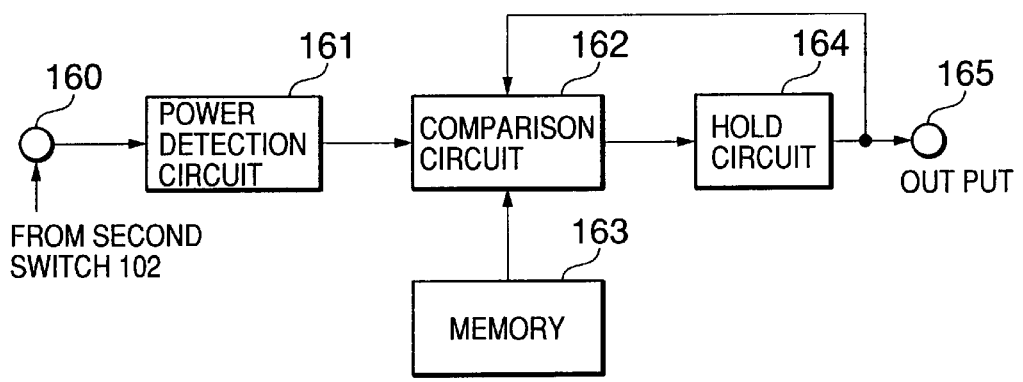
FIG. 6 is a block diagram showing an arrangement of a packet detection circuit in FIG. 5.

The packet detection circuit 108 can be constituted as shown in FIG. 6.

In FIG. 6, reference numeral 160 denotes an input terminal: 161, a power detection circuit; 162, a comparison circuit; 163, a memory; 164, a hold circuit; and 165, an output terminal.

The input terminal 160 receives a signal supplied from the second switch (102). The power detection circuit 161 calculates the average power of the input signal, and outputs the calculated average power to the comparison circuit 162. The comparison circuit 162 receives the average power from the power detection circuit 161, an average packet detection power threshold stored in the memory 163, and the packet receive pulse p from the hold circuit 164.

When no packet receive pulse p is input, the comparison circuit 162 compares the average power input from the power detection circuit 161 with the average packet detection power threshold stored in the memory 163. If the average power is larger than the threshold, the comparison circuit 162 determines that a packet was received, and outputs a packet arrival detection pulse to the hold circuit 164. Upon reception of the packet arrival detection pulse, the hold circuit 164 holds it and outputs the packet receive pulse p from the output terminal 165 during reception of the packet.

In this example, the packet has a fixed length, and the packet transmission time is obtained in advance. The hold circuit 164 holds the packet arrival detection pulse over this time.

When a packet to be transmitted has a variable length, and the packet length is indicated in the header or the like, the hold time can be obtained by informing the hold circuit 164 of the hold time from a header interpreting portion.

The packet receive pulse p is supplied to the antenna switching control circuit 103, first switches 101-1 to 101-n, and demodulation section 110. The demodulation section 110 is comprised of the demodulation circuits 105-1 to 105-n, addition circuit 106, and determination circuit 107. The packet receive pulse p is supplied to all the circuits.

When no packet receive pulse p is input, the antenna switching control circuit 103 outputs to the second switch (102) an antenna switching signal for selecting a signal to be output from n input signals from the first switches 101-1 to 101-n.

When the packet receive pulse p is input, the antenna switching control circuit 103 outputs an antenna switching signal as a null signal to stop operating the second switch 102.

Figure 7:
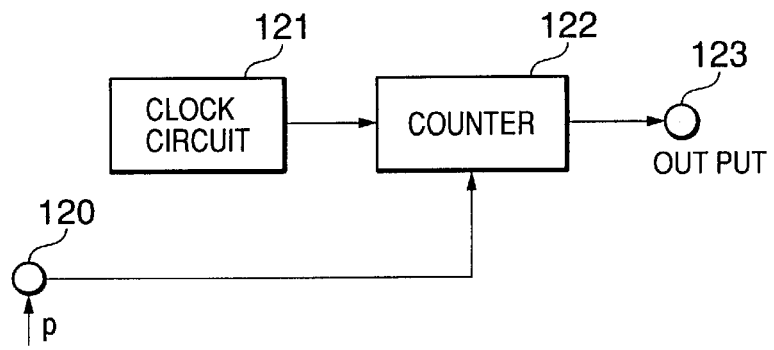
FIG. 7 is a block diagram showing the arrangement of an antenna switching control circuit in FIG. 5.

The antenna switching control circuit 103 can be constituted as shown in FIG. 7. In FIG. 7, reference numeral 120 denotes an input terminal; 121, a clock circuit; 122, a counter; and 123, an output terminal. The clock circuit 121 outputs a pulse corresponding to a period during which signals from the first switches 101-1 to 101-n are selected.

The counter 122 cyclically counts up from 1 to n. The counter 122 counts up pulses from the clock circuit 121, and outputs the values 1 to n as antenna switching signals to the output terminal 123.

The second switch 102 receives an antenna switching signal which takes the n values, and selects and outputs one of the n input signals based on the antenna switching signal.

The input terminal 120 receives the packet receive pulse p, which is supplied to the counter 122. When the packet receive pulse p is input, the counter 122 stops the above operation and outputs a null signal so as not to perform any antenna switching control.

The demodulation section 110 operates only when the packet receive pulse p is input. The demodulation section 110 receives signals supplied from the first switches 101-1 to 101-n, demodulates the signals, and outputs the demodulation results to the output terminal 109.

The demodulation section 110 comprises, for example, the demodulation circuits 105-1 to 105-n for demodulating signals from the first switches 101-1 to 101-n, addition circuit 106 for adding outputs from the demodulation circuits 105-1 to 105-n, and determination circuit 107 for determining an output from the addition circuit 106.

Figure 8:
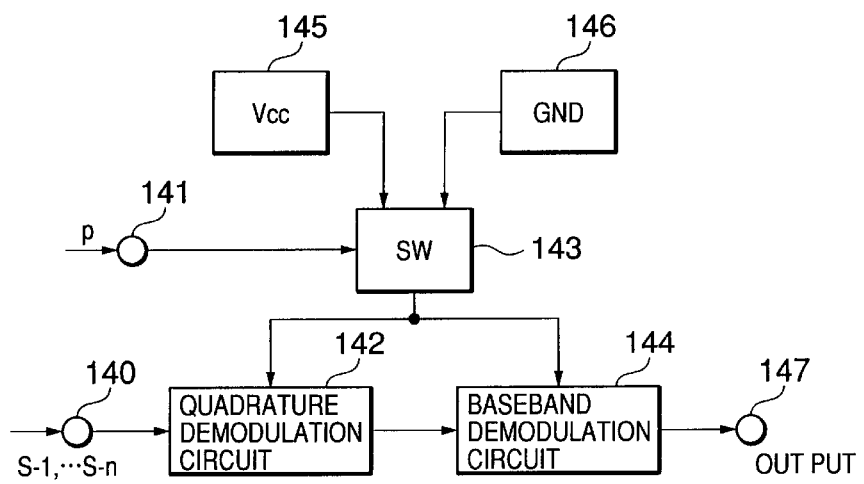
FIG. 8 is a block diagram showing an arrangement of each demodulation circuit in FIG. 5.

The demodulation circuits 105-1 to 105-n can be constituted as shown in FIG. 8. In FIG. 8, reference numerals 140 and 141 denote input terminals; 142, a quadrature demodulation circuit; 143, a switch; 144, a baseband demodulation circuit; 145, a power supply voltage; 146, a ground; and 147, an output terminal.

The input terminal 140 receives signals from the first switches 101-1 to 101-n, whereas the input terminal 141 receives the packet receive pulse p.

The packet receive pulse p from the input terminal 141 is input to the switch 143. When the packet receive pulse p is input, the switch 143 applies the power supply voltage 145 to the quadrature demodulation circuit 142 and baseband demodulation circuit 144, and demodulates the signals s-1 to s-n from the first switches 101-1 to 101-n input via the input terminal 140.

When no packet receive pulse p is input, the switch 143 inputs the ground-level signal 146 to the demodulation circuit 142 and baseband demodulation circuit 144 to stop operation of the demodulation circuit 142 and baseband demodulation circuit 144, thus saving power consumption.

Similar to the demodulation circuits 105-1 to 105-n, the addition circuit 106 and determination circuit 107 also receive a power supply voltage and operate only when the packet receive pulse p is input.

When no packet receive pulse p is input, the addition circuit 106 and determination circuit 107 receive a ground-level signal to save power consumption without any operation.

Figure 9:
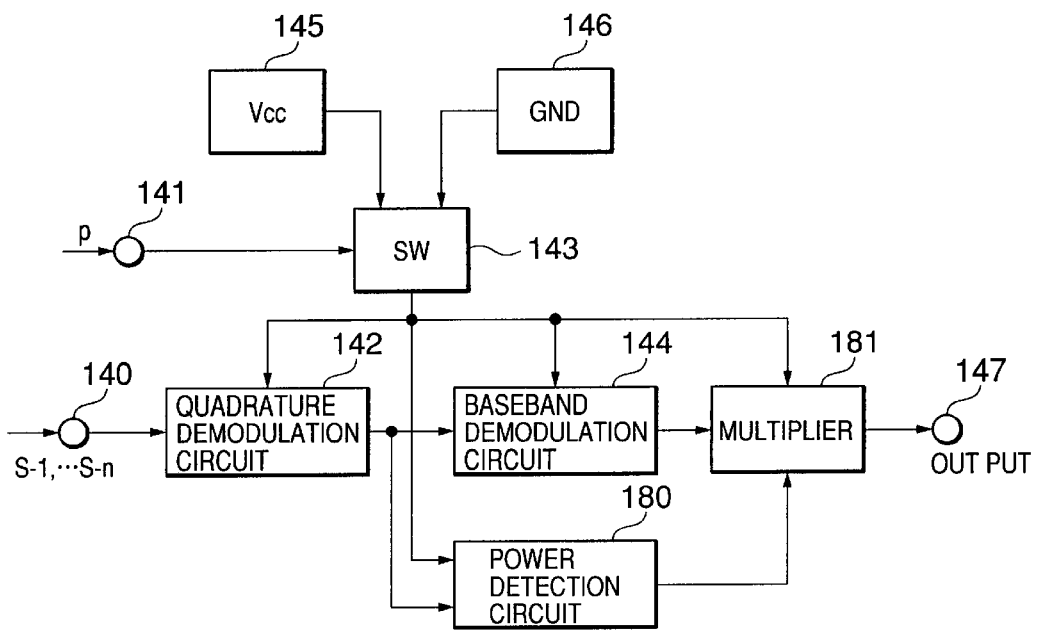
FIG. 9 is a block diagram showing another arrangement of each demodulation circuit in FIG. 5.

Alternatively, the demodulation circuits 105-1 to 105-n can be constituted as shown in FIG. 9. In FIG. 9, each demodulation circuit comprises input terminals 140 and 141, quadrature demodulation circuit 142, switch 143, baseband demodulation circuit 144, power supply voltage 145, and ground 146. Reference numeral 180 denotes a power detection circuit; and 181, a multiplier. The demodulation circuit further comprises the output terminal 147.

The block diagram of FIG. 9 is different from that of FIG. 8 in that the multiplier 181 weights an output from the baseband demodulation circuit 144 by the power of an output from the quadrature demodulation circuit 142 (output from the power detection circuit 180). This arrangement enables synthesis considering the reception power level and improvement of reception characteristics.

Diversity Receiver According to Second Embodiment

The second embodiment of a diversity receiver according to the present invention will be described with reference to the block diagram of FIG. 10.

Figure 10:
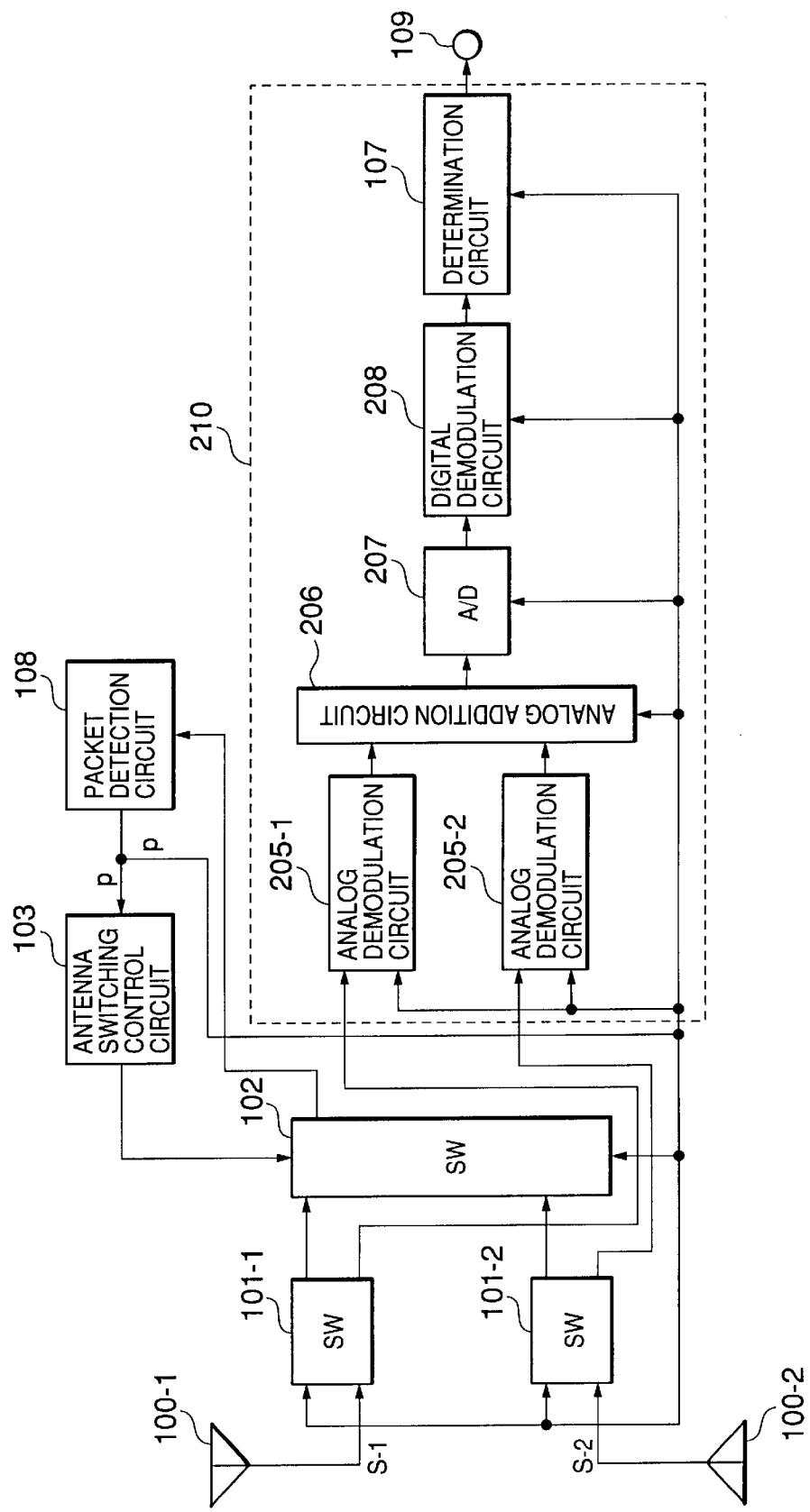
FIG. 10 is a block diagram showing the schematic arrangement of a diversity receiver according to the second embodiment of the present invention.

In FIG. 10, n=2 for descriptive convenience. However, the number n can be easily increased.

In FIG. 10, reference numerals 100-1 and 100-2 denote two antenna branches; 101-1 and 101-2, first switches; 102, a second switch; 103, an antenna switching control circuit; and 108, a packet detection circuit.

Reference numerals 205-1 to 205-n denote analog demodulation circuits corresponding to respective antenna branches; 206, an analog addition circuit; 207, an analog-to-digital conversion circuit (A/D); 208, a digital demodulation circuit; 107, a determination circuit; and 109, an output terminal. The circuits 205-1 to 205-n, 206, 207, 208, and 107, and output terminal 109 constitute a demodulation section 210.

The arrangement of the second embodiment in FIG. 10 is greatly different from that of the first embodiment in FIG. 5 in that outputs from the first switches 101-1 and 101-2 are first demodulated by the analog demodulation circuits 205-1 and 205-2, and then the results are added by the addition circuit 206.

The sum is quantized by the A/D converter 207 and demodulated by the digital demodulation circuit 208.

This arrangement can downsize the digital demodulation circuit and realize a small size and low power consumption.

Figure 11:
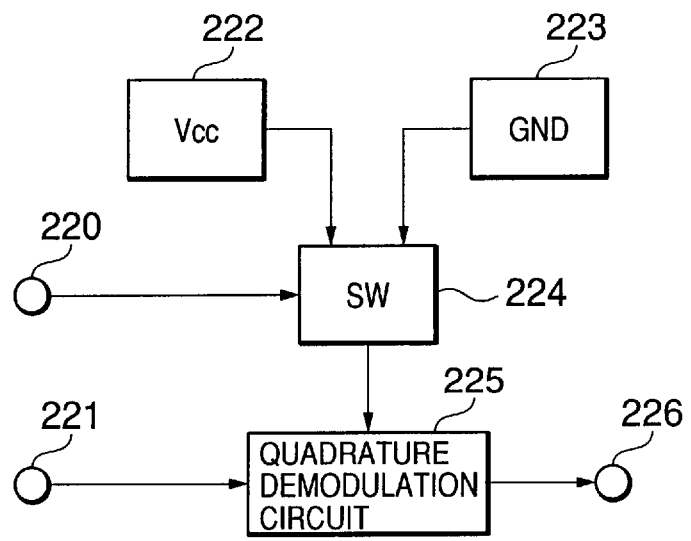
FIG. 11 is a block diagram showing an arrangement of each analog demodulation circuit in FIG. 10.

Each of the analog demodulation circuits 205-1 and 205-2 can be realized using a quadrature demodulation circuit 225, as shown in FIG. 11.

In FIG. 11, reference numerals 220 and 221 denote input terminals; 222, a power supply voltage (Vcc); 223, a ground (GND); and 224, a switch. The analog demodulation circuit has the quadrature demodulation circuit 225. Reference numeral 226 denotes an output terminal.

Diversity Receiver According to Third Embodiment

The third embodiment of a diversity receiver according to the present invention will be described with reference to the block diagram of FIG. 12.

In FIG. 12, n=2, but the number n can be easily increased.

In FIG. 12, reference numerals 100-1 and 100-2 denote two antenna branches; 101-1 and 101-2, first switches; 102, a second switch; 103, an antenna switching control circuit; 250, an analog addition circuit; 251, an analog demodulation circuit; 207, an analog-to-digital conversion circuit (A/D); 208, a digital demodulation circuit; 107, a determination circuit; 108, a packet detection circuit; 109, an output terminal; and 210, a demodulation section.

The arrangement of the third embodiment in FIG. 12 is different from that of the second embodiment in FIG. 10 in that the sum of outputs from the switches 101-1 and 101-2 by the analog addition circuit 250 is demodulated by the analog demodulation circuit 251.

This arrangement can downsize the analog demodulation circuit and realize a small size and low power consumption.

Diversity Receiver According to Fourth Embodiment

The fourth embodiment of a diversity receiver according to the present invention will be described with reference to the block diagram of FIG. 13.

Figure 13:
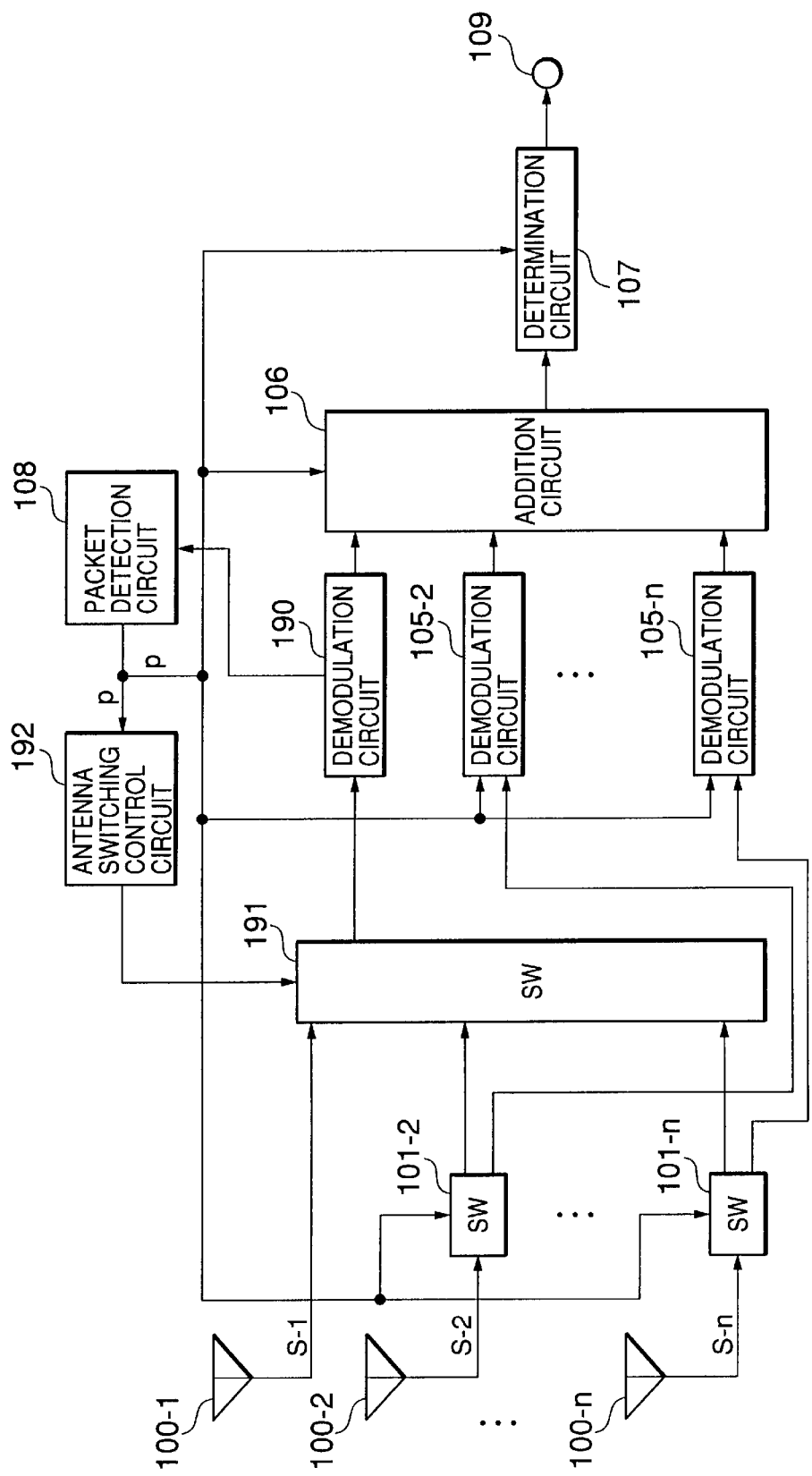
FIG. 13 is a block diagram showing the schematic arrangement of a diversity receiver according to the fourth embodiment of the present invention.

In FIG. 13, reference numerals 100-1 to 100-n denote n antenna branches; 101-2 to 101-n, (n−1) first switches; 191, a second switch; 192, an antenna switching control circuit; 190, a first demodulation circuit; 105-2 to 105-n, second demodulation circuits corresponding to the (n−1) first switches; 106, an addition circuit; 107, a determination circuit; 108, a packet detection circuit; and 109, an output terminal.

The arrangement of the fourth embodiment in FIG. 13 is greatly different from that of the first embodiment in FIG. 5 in that the first demodulation circuit 190 which always operates is adopted, and the number of second demodulation circuits 105-2 to 105-n which operate only when the packet receive pulse p is input is decreased to (n−1).

In this arrangement, when the packet receive pulse p is input, the antenna switching control circuit 192 controls the second switch 191 so as to input an input signal from a specific antenna branch to the first demodulation circuit 190.

This arrangement allows the packet detection circuit 108 to perform packet detection based on a demodulated signal. Consequently, noise can be suppressed by demodulation to realize high-reliability packet detection.

Figure 14:
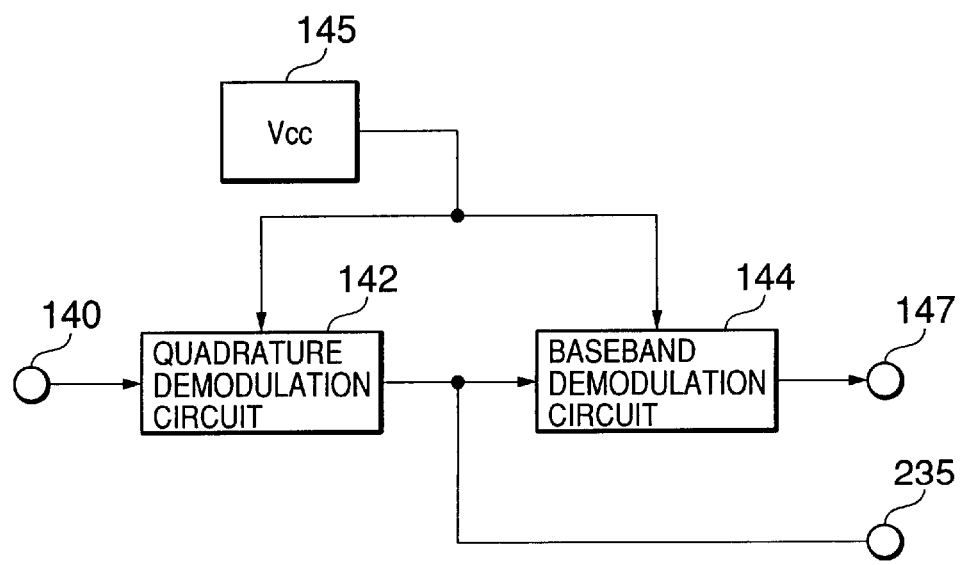
FIG. 14 is a block diagram showing an arrangement of a demodulation circuit 190 shown in FIG. 13.

The first demodulation circuit 190 can be constituted as shown in FIG. 14. In FIG. 14, reference numeral 140 denotes an input terminal; 142, a quadrature demodulation circuit; 144, a baseband demodulation circuit; 145, a power supply voltage; and 147 and 235, output terminals.

A signal from the second switch 191 is input via the input terminal 140 and demodulated by the quadrature demodulation circuit 142. The demodulation result is supplied to the packet detection circuit 108 via the output terminal 235 and to the baseband demodulation circuit 144. The baseband demodulation circuit 144 outputs the demodulation result to the output terminal 147.

At this time, the power supply voltage 145 is kept applied to the quadrature demodulation circuit 142 and baseband demodulation circuit 144, which continuously operate.

The operations of embodiments according to the present invention have been described in detail with reference to the accompanying drawings. However, the present invention is not limited to the above embodiments, and can be modified without departing from the spirit and scope of the invention.

What is claimed is:

1. A diversity reception method for a diversity receiver having n (integer not smaller than 2) antenna branches for receiving a packet made up of a preamble field and data field, comprising the steps of:

switching the n antenna branches to detect packet arrival when no packet arrival is detected;

stopping switching the n antenna branches when packet arrival is detected;

energizing demodulating means in response to the detected packet arrival;

performing reception operation by demodulating the packet based on all signals received by the n antenna branches after packet detection; and receiving and adding outputs from the demodulation means by an addition circuit when a "packet receive pulse" is input.

2. A diversity receiver having n (integer not smaller than 2) antenna branches for receiving a packet made up of a preamble field and data field, comprising:

n first switches for receiving signals respectively received by the n antenna branches and a "packet receive pulse" representing that the packet is being received, and changing an output destination based on the "packet receive pulse";

a second switch for receiving an antenna switching signal and outputs from said n first switches, and when no "packet receive pulse" is output, selecting and outputting the outputs from said n first switches based on the antenna switching signal;

a packet detection circuit for receiving an output from said second switch, and when the packet is being received, outputting the "packet receive pulse";

an antenna switching control circuit for outputting said antenna switching signal when the "packet receive pulse" is not input;

a demodulation section for receiving and demodulating all or some of the outputs from said n first switches when the "packet receive pulse" is input.

3. A receiver according to claim 2, wherein said demodulation section comprises demodulation circuits for receiving and demodulating all or some of the outputs from said n first switches when the "packet receive pulse" is input, and an addition circuit for receiving and adding outputs from said demodulation circuits when the "packet receive pulse" is input.

4. A receiver according to claim 3, wherein said demodulation circuits and said addition circuit are of analog type, and an A/D converter and digital demodulation circuit are arranged on an output side of said demodulation circuits and said addition circuit.

5. A receiver according to claim 2, wherein said demodulation section comprises an addition circuit for receiving and adding all or some of the outputs from said n first switches when the "packet receive pulse" is input, and a demodulation circuit for receiving an output from said addition circuit, and operating only when the "packet receive pulse" is input.

6. A receiver according to claim 5, wherein said addition circuit and said demodulation circuit are of analog type, and an A/D converter and digital demodulation circuit are arranged on an output side of said addition circuit and said demodulation circuit.

7. A receiver according to claim 3, wherein each of said demodulation circuits comprises a first input terminal for receiving a signal from a corresponding first switch, a second input terminal for receiving the "packet receive pulse", a quadrature demodulation circuit for receiving the signal input to said first input terminal, a baseband demodulation circuit for receiving a demodulated signal from said quadrature demodulation circuit and outputting a demodulation result to an output terminal, and a switch for applying a power supply voltage to said quadrature demodulation circuit and baseband demodulation circuit only when the "packet receive pulse" is input.

8. A receiver according to claim 3, wherein each of said demodulation circuits comprises a first input terminal for receiving a signal from a corresponding first switch, a second input terminal for receiving the "packet receive pulse", a quadrature demodulation circuit for receiving the signal input to said first input terminal, a baseband demodulation circuit for receiving a demodulated signal from said quadrature demodulation circuit and outputting a demodulation result, a multiplier for multiplying the demodulation result of said baseband demodulation circuit and outputting a product to an output terminal, a power detection circuit arranged between said quadrature demodulation circuit and multiplier to detect power of said quadrature demodulation circuit, and a switch for applying a power supply voltage to said quadrature demodulation circuit, said baseband demodulation circuit, and said multiplier only when the "packet receive pulse" is input.

9. A receiver according to claim 4, wherein each of said demodulation circuits comprises a first input terminal for receiving a signal from a corresponding first switch, a second input terminal for receiving the "packet receive pulse", a quadrature demodulation circuit for receiving the signal input to said first input terminal, and a switch for applying power voltage to said quadrature demodulation circuit only when the "packet receive pulse" is input.

10. A receiver according to claim 2, wherein said packet detection circuit comprises:

an average power detection circuit for calculating an average power of a signal input from said second switch;

a memory for storing a packet detection threshold as a threshold for detecting packet arrival;

a comparison circuit for comparing an output from said average power detection circuit with the packet detection threshold when no "packet receive pulse" is input, determining that packet arrival is detected and outputting a packet arrival detection pulse when the output from said average power detection circuit exceeds the packet detection threshold, and not comparing the output from said average power detection circuit with the packet detection threshold when the "packet receive pulse" is input; and a hold circuit for holding the packet detection pulse over a duration time of the packet and outputting the packet detection pulse as the "packet receive pulse" when the "packet receive pulse" is input.

11. A receiver circuit according to claim 2, wherein said antenna switching control circuit comprises:

a clock circuit having as a period a time during which signals respectively received by said n antenna branches are observed; and a counter which is reset when the "packet receive pulse" is input, and cyclically counts up from 1 to n based on an output from said clock circuit to output n count values as antenna switching signals when no "packet receive pulse" is input.

12. A diversity receiver having n (integer not smaller than 2) antenna branches for receiving a packet made up of a preamble field and data field, comprising:

(n−1) first switches for receiving signals respectively received by (n−1) antenna branches and a "packet receive pulse" representing that the packet is being received, and changing an output destination based on the "packet receive pulse";

a second switch for receiving an antenna switching signal and outputs from said (n−1) first switches, and when no "packet receive pulse" is output, selecting and outputting the outputs from said (n−1) first switches based on the antenna switching signal;

one (n−(n−1)) antenna branch which is not connected to said first switches, and always directly outputs a reception signal to said second switch regardless of input/non-input of the "packet receive pulse";

one specific demodulation circuit for receiving a signal received by said (n−(n−1)) antenna branch via said second switch to always perform demodulation operation;

a packet detection circuit for receiving a demodulated signal from said specific demodulation circuit, and when the packet is being received, outputting the "packet receive pulse"; and a demodulation section for receiving and demodulating all or some of the outputs from said (n−1) first switches when the "packet receive pulse" is input.

13. A receiver according to claim 12, wherein said specific demodulation circuit comprises an input terminal for receiving a signal from said (n−(n−1)) antenna branch, a quadrature demodulation circuit for demodulating the input signal, an output terminal for outputting a demodulated signal from said quadrature demodulation circuit to said packet detection circuit, and a baseband demodulation circuit for receiving the demodulated signal from said quadrature demodulation circuit and outputting a demodulation result.

* * * * *